United States Patent [19]

Conrad

[11] Patent Number: 5,572,827
[45] Date of Patent: Nov. 12, 1996

[54] METHOD FOR APPLYING HYDROGEL COATINGS TO EMBRYONIC PLANTS

[75] Inventor: Robert S. Conrad, Wheaton, Ill.

[73] Assignee: Ball Horticultural Company, West Chicago, Ill.

[21] Appl. No.: 435,648

[22] Filed: May 5, 1995

[51] Int. Cl.$^6$ .............. A01C 1/00; A01C 1/06; A01C 21/00
[52] U.S. Cl. .............. 47/57.6; 47/58; 47/DIG. 9; 47/DIG. 11; 426/419; 427/4; 800/200
[58] Field of Search .......... 47/57.6, 58, DIG. 9; 800/200; 426/419; 435/180; 427/4; 504/113.1

[56] References Cited

U.S. PATENT DOCUMENTS

| | | | |
|---|---|---|---|
| 3,688,437 | 9/1972 | Hamrin | 47/57.6 |
| 3,734,987 | 5/1973 | Hamrin | 47/57.6 |
| 4,562,663 | 1/1986 | Redenbaugh | 47/58 |
| 4,583,320 | 4/1986 | Redenbaugh | 47/57.6 |
| 4,658,539 | 4/1987 | Sluis | 47/57.6 |
| 4,672,035 | 6/1987 | Davidonis et al. | 435/240 |
| 4,715,143 | 12/1987 | Redenbaugh et al. | 47/57.6 |
| 4,777,762 | 10/1988 | Redenbaugh et al. | 47/57.6 |
| 4,779,376 | 10/1988 | Redenbaugh | 47/57.6 |
| 4,780,987 | 11/1988 | Nelsen et al. | 47/57.6 |
| 4,808,430 | 2/1989 | Kouno | 427/4 |
| 4,905,411 | 3/1990 | Finch-Savage | 47/58 |
| 5,236,469 | 8/1993 | Carlson et al. | 47/57.6 |
| 5,427,593 | 6/1995 | Carlson et al. | 47/57.6 |

FOREIGN PATENT DOCUMENTS

| | | | |
|---|---|---|---|
| 0141374 | 5/1985 | European Pat. Off. | 47/57.6 |

OTHER PUBLICATIONS

Product Description of "The Algin–Tex System" sold by the Kelco Division of Merck and Co.

Taylor et al., *Hort. Science* 16(2): 198–200 (1981).

Taylor et al., *Hort. Science* 13(4): 481–482 (1978).

Redenbaugh, et al., 1988, "Encapsulated Plant Embryos", Biotechnology in Agriculture 9:225–245.

Redenbaugh, et al., 1987, "Encapsulation of Somatic Embryos in Synthetic Seed Coats", Hortscience 22(5):803–809.

*Primary Examiner*—Howard J. Locker

[57] ABSTRACT

The invention is drawn to a method of applying a hydrogel coating to embryonic plants to improve early plant growth by controlling the amount of cross-linking. A dry coating of a water-soluble hydrogel in powder form is built up around individual embryonic plants. The powder-coated plants are introduced into a water bath which is free of polyvalent metal ions to partially hydrate the coatings. Rapidly thereafter and before the coatings are fully hydrated, the bath is modified by dispersing cross-linking polyvalent metal ions therein. The contact time of the coated plants in the modified bath is limited so that the polyvalent metal ions diffuse into the coatings and form an inwardly decreasing concentration gradient therein. The plants are separated from the modified bath so that the polyvalent metal ions are redistributed and equilibrated within the coatings. The resulting coatings are in a uniform partially cross-linked condition which promotes leaf emergence and plant vigor.

18 Claims, No Drawings

METHOD FOR APPLYING HYDROGEL COATINGS TO EMBRYONIC PLANTS

FIELD OF INVENTION

The field of this invention is the use of hydrogel coatings on embryonic plants such as seeds and somatic embryos.

BACKGROUND OF INVENTION

Pelletizing small size seeds facilitates handling and planting. Various coating procedures have been used for this purpose. For example, it is known to coat plant seeds with hydrocolloids which hydrate to form gels, and thereby provide gel coatings around singulated seeds. Such coatings have been used particularly with pregerminated seeds, making it possible to handle and plant the pregerminated seeds without physical damage. This protective action can be of particular importance where the seeds have been germinated to the stage of radicle emergence.

Prior art methods of applying hydrogel coatings to plant seeds are described in Redenbaugh et al., U.S. Pat. No. 4,715,143 and Nelson et al., U.S. Pat. No. 4,780,987. The hydrocolloid, such as sodium alginate, is formed into an aqueous solution, and individual seeds are coated with this solution. The coated seeds are contacted with an aqueous solution of a complexing or cross-linking reagent, such as calcium chloride, which provides calcium ions that react with the alginate to increase viscosity and reduce water solubility.

As described in the cited Redenbaugh et al. patent (cols 4–5), the complexing agent may be mixed with the gel-forming solution and applied to the seeds or other living material to be encapsulated. Alternatively, as described in the paragraph bridging columns 4–5, a vibratory nozzle apparatus may be used to eject gel droplets containing the material to be encapsulated. These droplets are coated with a complexing agent.

More commonly, as described in the Nelson et al. patent (cols 6–7), seeds are dispersed in a gel solution which is added drop-wise to the aqueous complexing reagent. Nelson et al. refers to a mechanized procedure using a vibratory nozzle which ejects seed-containing gel droplets from one source and coats the droplets with a complexing agent from another.

Heretofore, as far as is known, cross-linked hydrogel coatings have not been applied to seeds by first building up a dry coating of hydrogel powder around the individual seeds. This type of coating is known for other purposes, as described for example in Sluis et al. U.S. Pat. No. 4,658,539. As therein disclosed, pregerminated seeds are coated by a pilling procedure for purpose of incorporating a growth retarding agent in the coatings.

The Kelco Division of Merck & Co., sells an alginate product under the name "ALGIN-TEX". Commercially available information concerning this product describes an "ALGIN-TEX System" to form cross-linked alginate matrices. As described in this "ALGIN-TEX" commercial brochure, an alginic polymer consists of units of alginic acid which have carboxyl side chains. The carboxyl groups are reactive with metal ions such as sodium to form sodium alginates. They are also reactive with polyvalent metal ions to form cross-links and thereby increase polymer chain lengths. As polyvalent metal ions are reacted with the alginic acid units, the viscosity of the solution increases because of the greater polymer chain lengths. When more fully cross-linked, insoluble fibers are formed which can precipitate out of solution.

SUMMARY OF INVENTION

This invention provides a method of applying hydrogel coatings to plant seeds and the like while avoiding or at least minimizing interference of the coatings with seed germination and resulting plant vigor. In prior art procedures using hydrogels, such as an alginate cross-linked with calcium ions, there has been little control over the extent of cross-linking of the hydrogel. When a liquid droplet containing a plant seed is contacted with an aqueous solution of calcium chloride, the calcium ions are available for reacting throughout the coatings. Such coatings become highly cross-linked and thereby essentially water-insoluble. Plants grown from pregerminated seeds encapsulated in this manner may exhibit reduced germination, reduced plant emergence, and reduced plant vigor.

In using the method of this invention, there is first formed a dry coating around individual seeds of a water-soluble hydrogel in powder form. A hydrogel is selected which is capable of cross-linking reaction with polyvalent metal ions. Next the dry-coated seeds are introduced into a water bath free of polyvalent metal ions to partially hydrate the coatings. Rapidly thereafter and before the coatings are fully hydrated, the bath is modified by dispersing cross-linking polyvalent metal ions therein. The contact time of the coated seeds with the modified bath is limited. The polyvalent metal ions diffuse into the coatings and form inwardly decreasing concentration gradients. The outer portions of the coating are thereby more highly cross-linked than the inner portions. The coated seeds are separated from the modified bath and held until the polyvalent metal ions redistribute and essentially equilibrate in the coatings. The resulting coatings throughout are in a partially cross-linked condition.

The foregoing method provides a means for obtaining a predetermined degree of cross-linking, since the amount of cross-linking can be controlled by the contact time in the treatment baths. By using a short standardized hydration time prior to contracting with polyvalent metal ions, the ions will diffuse into the coatings as the coatings continue to hydrate. The diffusion is terminated at a predetermined time at which there is an inward concentration gradient of the calcium iotas within the coatings. For example, the outer portion of the coatings may then contain sufficient calcium to be essentially fully cross-linked and therefore insolubilized, while the inner portions contain less calcium and remain water-soluble. On separation of the seeds from the treating bath they contain a gradient distributed total amount of calcium ions. By holding the seeds, the higher concentration of the outer layers redistributes to an essentially uniform concentration throughout the coatings. The final coatings will have a controlled degree of water solubility. Preferably, no portion of the coatings remain cross-linked to water insolubility.

In comparative studies of the method of this invention using variable contact times in the treating baths, it has been found that early growth of the seeds is improved by limiting the contact times. For example, in a preferred embodiment pregerminated powder-coated seeds are hydrated for 30 seconds and then contacted with calcium ions for 5 to 6 minutes. When the contact time in the calcium ion-providing bath is increased to 15 minutes, the coated seeds exhibit lower plant emergence. Even more dramatically, the resulting plants have substantially reduced vigor, as photographically measured by the extent of early leaf growth.

DETAILED DESCRIPTION

When using the method of this invention, a gel material should be selected which has a cross-linking reaction with polyvalent metal ions. It is preferred that the hydrogel material prior to cross-linking is water-soluble, and that it be capable of cross-linking reaction to an insoluble condition, or at least to a condition of increased viscosity. A preferred hydrogel is an alginate polymer such as sodium alginate. Another natural gel material which can be employed is pectin, viz. as sodium pectate. If desired a mixture of hydrocolloids can be employed such as a mixture of alginate and pectinate.

The polyvalent metal ions used for cross-linking should be non-toxic to plants. Calcium is preferred, and can be used in the form of its non-toxic water soluble salts. Calcium nitrate is especially desirable since the nitrate ion provides a fertilizer ingredient. Other water soluble salts of polyvalent metals can be used such as ferric chloride. Calcium ions are believed to be the most effective for forming cross-links with alginic molecules.

The coating method of this invention is advantageous for both flower seeds and vegetable seeds, and especially for small size and/or pregerminated flower or vegetable seeds. In preferred embodiments, the seeds have been germinated to the stage of radicle emergence, and the hydrogel coatings provide protection for the emerged radicles. In commercial application, the plant seeds are germinated to the stage of emerged radicles, and the seeds are coated by the method of this invention, and then stored and shipped under refrigeration. The coated seeds may be planted in plug flats by commercial growers.

The method is applicable to other embryonic plant materials besides seeds such as somatic embryos. It should be understood that the term "embryonic plants" is used herein generically for meristematic plant material capable of developing into an entire plant.

In certain preferred embodiments, plant seeds are used and pregerminated to a stage where radicles have emerged in most of the seeds, for example, in 90% or more of the seeds. In applying the method to such pregerminated seeds, it is not necessary to sort the seeds after germination to eliminate seeds that do not have emerged radicles.

The method is particularly advantageous when used with seeds of very small size, such as seeds which are usually pelleted to facilitate handling. In marketing of flower seeds to commercial growers, it may also be desirable to pregerminate the small size seeds and then coat the seeds in accordance with the present invention.

In the first step of the method, the seeds to be coated, such as pregerminated flower seeds, are provided with a substantially dry coating of water-soluble hydrogel material in powder form. For example, as indicated above, sodium alginate or sodium pectinate powders can be used. The dry coating can be built up according to known pelletizing procedures. For example, the seeds may be placed in a rotary pelleting pan, and sprayed with a fine mist of water as the seeds rotate. The water may contain an adhesive agent.

A small amount of the hydrogel powder is added to form a coating layer around the individual seeds. This process can be repeated a series of time with intermittent sprayings of water and addition of hydrogel powder. In this way the seed pellets are built up to a desirable screen size. The coated seeds may be screened to remove oversize and undersize pellets. The size-selected coated seeds are introduced into a room temperature (e.g. 20°–25° C. ) water bath to partially hydrate the hydrogel coatings. The bath may contain a low concentration of a fertilizer ingredient such as potassium nitrate, but it is free of polyvalent metal or other substance reactive with the hydrogel. It is desired to limit the extent of hydration. The contact time in the non-reactive water bath should be shorter than that required to fully hydrate the seed coatings. A preferred initial contact time is 30 seconds. This may be varied somewhat, for example, by using from 15 to 45 seconds. Preferably the hydration is for less than 60 seconds and more than 10 seconds.

When the coatings are partially hydrated, a solution of complexing agent is dispersed in the bath containing the seeds. For example, a solution of calcium nitrate can be added. The added solution can be fairly concentrated, such as 5 to 10% w/v $CaNO_3$.

These treatment operations are carried out with gentle stirring of the seeds in the bath. Stirring is preferably started at the time the seeds are introduced into the initial water bath and continued throughout the contacting.

To control the amount of complexing agent introduced into the gel coatings, the contacting is preferably carefully timed. For example, using an initial hydration of 30 seconds, the reactions contacting with the modified solution is carried out in 5 to 6 minutes. With shorter times, less complexing agent will diffuse into the coatings. As the contact time is extended the coatings will absorb more of the complexing agent. It is desired to form a decreasing concentration from the outside to the insides of the coatings. The reaction contacting should not therefore be permitted to proceed until coatings are saturated with the complexing agent and thereby insolubilized.

A reaction contacting time of around 5 to 6 minutes has been found desirable but somewhat shorter or longer contacting times can be used, for example, from 3 minutes to 9 minutes. If the concentration of the complexing agent in the contacting solution is increased then the contact time can be reduced, or conversely, if the concentration is reduced, the contacting time can be extended.

The reaction contacting is terminated by removing the coated seeds from the reaction bath. The removed seeds are further separated from the residual treating solution by drainage, such as on a screen, and the seeds may be washed with water on the separating screen.

The coatings on the seeds is in gel form. After internal redistribution of the complexing agent, the coatings throughout will be only partially cross-linked. The seeds can be planted shortly after completion of the coating process. Redistribution and equilibration of the complexing agent will occur even after the seeds are planted. However, the seeds will usually be held for a substantial periods. In commercial processing, it may be preferred to store the seeds in sealed containers under refrigeration, which can be distributed to commercial growers.

To facilitate handling, the coated seeds may be dusted with an anti-caking powder such as talc. It is desired to have the seeds in free-flowing condition. Also, to absorb free moisture, a drying powder may be used.

ILLUSTRATIVE EXAMPLE

Dry Process

Plant seeds, which may be pregerminated, are pelletized using sodium alginate powder. The pelletizing can be carried out in a rotating pan employing an airbrush for applying a water mist to the rotating seeds. The applied spray may contain a pelletizing agent such as "VANGEL", viz 3% w/v of VANGEL. This pelletizing agent is a smectite clay sold by R.I. Vanderbilt Company of Norwalk, Conn. The rotating pan is turned on and a speed selected. Preferably a slower speed is used. The airbrush is held over the seed with the nozzle pointed toward the center of the rotating seeds. The water mist is sprayed until the seeds appear slightly wet. When the seeds begin to clump as they roll around in the pan, spraying is terminated. The addition of the alginate powder is started, using a small amount at a time, such as 0.40 to 0.45 ounces of powder per ounce of seeds. Mist spraying and addiction of alginate powder is repeated as often as necessary to build up the seeds to a desired pellet size. For example, a pellet size of 10 (A.S.T.M.E.) can be used. The pelletized seeds can be screened to remove oversize and undersize pellets. The oversize pellets are discarded and the undersize can be returned to the coating pan.

Wet Process

Ion free water, such as distilled water, can be used to form a room temperature (20°–25° C. ) coating bath. The bath may contain 0.5% w/v $KNO_3$ as a fertilizer. A modifying solution is prepared comprising an aqueous solution of calcium nitrate. This solution may contain 7.5% w/v $CaNO_3$, and can be prepared by dissolving 70g calcium nitrate per liter of water. For modifying the bath 100 ml of this solution is added per 2 liters of bath.

The coating bath is provided with a stirring device which can create a vortex when operated at low speeds. With the stirrer in operation, the dry coated seeds are introduced into the vortex of the water bath. After 30 seconds, the calcium nitrate modifier solution is added. Stirring is continued and the seeds are permitted to remain in the bath for 5 to 6 additional minutes. The coated seeds are then removed from the complexing solution. For example, the coating bath may be poured into a screen box with a small mesh size for retaining the seeds. The seeds can be rinsed with water while in the screen box, and excess water vacuumed off until the coated seed surfaces appear dry. The seeds are then placed in containers. The addition of small amounts of drying or anti-caking powder can be used.

Comparative Example

The small size of impatiens seeds makes it desirable to pelletize the seeds to facilitate handling and planting. This study was conducted with four varieties of commercial impatiens seeds which are marketed by the Ball Seed Company of West Chicago, Illinois. These varieties are sold under the names "SUPPER ELFIN BLUSH", "SUPPER ELFIN SALMON", "SUPPER ELFIN ORANGE", and "SUPPER ELFIN VELVET". These varieties normally exhibit somewhat different growth characteristics.

Each variety of impatiens was pregerminated by a standard pregerminating procedure, for example, using overnight pregermination in water columns with an incubation temperature of about 25° C. The pregerminated seeds were recovered and externally dewatered by centrifugation. More than 90% of the pregerminated seeds of each of the four varieties had emerged radicles. These pregerminated seeds were used without separating seeds without radicles.

Two batches of each of the varieties were coated as described in the foregoing Illustrative Example. Identical conditions were used except that one batch of the coated seeds was held in the modified bath containing the calcium ion for 5 minutes and a second batch for 15 minutes.

After recovery of the seeds, the resulting "gelballs" were sown in plug flats, which were held under standard growth conditions of temperature, light and watering for promoting growth. As a control, uncoated pregerminated seeds of each of the four varieties was sown in plug flats and grown under the same conditions. All flats were visually and photographically examined after seven days.

The data is summarized below in Table A.

Leaf emergence was determined by the percent of the plants displaying dicotyledons. The photographs of the plug trays were processed to obtain a "Vigor Index". Machine vision image analysis was used. The image analysis equipment measured the total surface area of the leaves of the seedlings in each plug flat. A standard deviation in the leaf area of the seedlings was determined by a computer program. The Vigor Index of the seedlings was determined by dividing the total surface area of the leaves by the standard deviation of the leaves multiplied by the leaf emergence percentage. This method of plant vigor comparison is described more particularly in my co-pending application Ser. No. 08/407,411, filed Mar. 17, 1995.

Other Examples

Commercial sodium pectinate powder is substituted in a similar amount for the alginate powder of the Illustrative Example set out above. In another alternative embodiment, moist somatic embryos are processed by the coating method of this invention. The procedure is otherwise the same as with respect to moist pregerminated seeds. Other examples and variations will occur to those skilled in the growth of flower and vegetable seeds.

TABLE A

Comparism of Early Plant Growth of Pregerminated Coated Varieties of Impatiens

| Variety | Leaf Emergence (%) | Leaf Growth Area as Vigor Index |
|---|---|---|
| Super Elfin Blush | | |
| Control-uncoated | 98 | 446 |
| Coated-5 min. | 96 | 442 |
| Coated-15 min. | 91 | 287 |
| Super Elfin Salmon | | |
| Control-uncoated | 98 | 354 |
| Coated-5 min. | 94 | 326 |
| Coated-15 min. | 69 | 116 |
| Super Elfin Orange | | |
| Control-uncoated | 96 | 472 |
| Coated-5 min. | 97 | 448 |
| Coated-15 min. | 82 | 233 |
| Super Elfin Velvet | | |
| Control-uncoated | 97 | 510 |
| Coated-5 min. | 88 | 270 |
| Coated-15 min. | 66 | 133 |

I claim:

1. Method of applying a cross-linked hydrogel coating to embryonic plants to improve early plant growth by controlling the amount of cross-linking, comprising the steps of:

(a) first building up a dry coating around individual embryonic plants of a water-soluble hydrogel in powder form, said powder being capable of cross-linking reaction with polyvalent metal ions when hydrated to gel form;

(b) next introducing the powder-coated plants into a water bath free of polyvalent metal ions to partially hydrate the coatings;

(c) rapidly thereafter and before the coatings are fully hydrated, modifying said bath by dispersing cross-linking polyvalent metal ions therein;

(d) limiting the contact time of the coated plants with the modified bath so that the polyvalent metal ions diffuse into the coatings and form an inwardly decreasing concentration gradient therein, the outer portions of the coatings being more highly cross-linked than the inner portions;

(e) then separating the resulting coated plants from the modified bath, and thereafter redistributing and equilibrating the polyvalent metal ions in the coatings so that the resulting coatings throughout are in a uniformly partially cross-linked condition which promotes leaf emergence and plant vigor.

2. The method of claim 1 in which said hydrogel powder is a water-soluble alginate.

3. The method of claim 2 in which said polyvalent metal ions are calcium ions.

4. The method of claims 1, 2 or 3 in which said embryonic plants are pregerminated seeds.

5. The method of claims 1, 2, or 3 in which said embryonic plants are pregerminated seeds with at least 90% thereof having emerged radicles.

6. The method of claim 1 in which said hydrogel powder is a water-soluble pectinate.

7. The method of claim 6 in which said polyvalent metal ions are calcium ions.

8. The method of claims 6 or 7 in which said embryonic plants are pregerminated seeds.

9. The method of claims 6 or 7 in which said embryonic plants are pregerminated seeds with at least 90% thereof having emerged radicles.

10. Method of applying a cross-linked hydrogel coating to embryonic plants to improve early plant growth by controlling the amount of cross-linking, comprising the steps of:

(a) first building up a dry coating around individual seeds of a water-soluble hydrogel in powder form, said powder being capable of cross-linking reaction with polyvalent metal ions when hydrated to gel form;

(b) next introducing the powder-coated plants into a water bath free of polyvalent metal ions to partially hydrate the coatings;

(c) rapidly thereafter and before the coatings are fully hydrated, modifying said bath by dispersing cross-linking polyvalent ions therein;

(d) limiting the contact time of the coated seeds with the modified bath so that the polyvalent metal ions diffuse into the coatings and form inwardly decreasing concentration gradients therein, the outer portions of the coatings being more highly cross-linked than the inner portions;

(e) separating the resulting coated seeds from the modified bath; and (f) holding the seeds until the polyvalent metal ions redistribute and equilibrate in the coatings so that the resulting coatings are in a uniformly partially cross-linked condition which promotes leaf emergence and plant vigor.

11. The method of claim 10 in which said hydrogel material is a water-soluble alginate.

12. The method of claim 11 in which said polyvalent metal ions are calcium ions.

13. The method of claims 10, 11, or 12 in which said seeds are pregerminated seeds.

14. The method of claims 10, 11 or 12 in which said seeds are pregerminated seeds with at least 90% thereof having emerged radicles.

15. The method of claim 10 in which said hydrogel material is a water-soluble pectinate.

16. The method of claim 15 in which said polyvalent metal ions are calcium ions.

17. The method of claims 15 or 16 in which said seed are pregerminated seeds.

18. The method of claim 15 or 16 in which said seeds are pregerminated seed with at least 90% thereof having emerged radicles.

* * * * *